United States Patent [19]
Barfod

[11] Patent Number: 6,166,840
[45] Date of Patent: Dec. 26, 2000

[54] ELECTRONIC CIRCUIT FOR RECEIVING AND DISCRIMINATING MODULATED LIGHT AND AN ELECTRONIC PRICE DISPLAY COMPRISING SAID CIRCUIT

[75] Inventor: Jesper Barfod, Dronningmoelle, Denmark

[73] Assignee: Esel-Krabbe Systems A/S, Kvistgaard, Denmark

[21] Appl. No.: 09/183,386

[22] Filed: Oct. 29, 1998

Related U.S. Application Data

[63] Continuation of application No. PCT/DK97/00189, Apr. 24, 1997.

[30] Foreign Application Priority Data

Apr. 29, 1996 [DK] Denmark .................................. 0512/96

[51] Int. Cl.[7] ...................................................... H04B 10/06
[52] U.S. Cl. ........................ 359/189; 359/194; 250/214 A; 250/214 R; 250/214 SW
[58] Field of Search ..................................... 359/189, 194, 359/214 A, 214 R, 214 SW, 214.1

[56] References Cited

U.S. PATENT DOCUMENTS

| | | | |
|---|---|---|---|
| 4,623,786 | 11/1986 | Rodwell | 250/214 A |
| 4,650,986 | 3/1987 | Maile | 250/214 SW |
| 4,679,251 | 7/1987 | Chown | 455/619 |
| 5,734,300 | 3/1998 | Yoder | 330/308 |
| 5,889,605 | 3/1999 | Claverie et al. | 359/189 |
| 5,949,567 | 9/1999 | Jebens | 359/189 |
| 6,084,232 | 7/2000 | Kimura | 250/214 A |

*Primary Examiner*—Huy D. Vu
*Assistant Examiner*—Dalzid Singh
*Attorney, Agent, or Firm*—Klein & Szeckeres, LLP

[57] ABSTRACT

An electronic circuit (50) for receiving and discriminating modulated light of a specific modulation frequency or within a specific modulation frequency range includes a photodiode detector (52) responsive to light incident thereto for generating an electric current signal. A controllable shunt (54) is connected in parallel with the photodiode detector (52) and is controllable between a first operational mode in which the current is shunted, and a second operational mode in which the current is not shunted. A control circuit (56) is connected to the photodiode detector (52) and the shunt (54) for controlling the controllable shunt (54) into (a) the first operational mode, provided that the current signal does not include a signal of the specific modulation frequency or within the specific modulation frequency range, or (b) the second operational mode, provided that the current signal includes a signal of the specific modulation frequency or within the specific modulation frequency range.

48 Claims, 3 Drawing Sheets

ELECTRONIC CIRCUIT FOR RECEIVING AND DISCRIMINATING MODULATED LIGHT AND AN ELECTRONIC PRICE DISPLAY COMPRISING SAID CIRCUIT

CROSS-REFERENCE TO RELATED APPLICATION

This application is a continuation of copending International Application No. PCT/DK97/00189; filed Apr. 24, 1997.

FEDERALLY SPONSORED RESEARCH OR DEVELOPMENT

Not Applicable

BACKGROUND OF THE INVENTION

The present invention relates to the technical field of receiving and detecting or discriminating information or signals transmitted in an optic link in particular an infrared link. More precisely, the present invention relates to an electronic circuit for receiving and detecting or discriminating modulating light of a specific modulation frequency or within a specific modulation frequency range.

In the present context, the expressions detecting and discriminating are to be conscrued generic terms which generally describe the technical phenomenon of evaluating an information signal which is received for determining whether or not the information signal is relevant or constitutes an information signal intended to be received and further processed by the receiver in question.

In numerous applications, an electronic circuit is used for receiving and detecting or discriminating modulated light including information or signals to be received and detected by the electronic circuit for controlling or displaying electronic equipment connected to the electronic circuit. Examples of applications or electronic circuits of this kind are among others wireless audio transmission systems, remote controllers for audio equipment or similar applications including door controllers, car blocking systems, data communication linkages etc. A particular application of electronic circuits of this kind is within the field of transmitting information from a master station or a back office computer to electronic price displays of the general type described in:

U.S. Pat. Nos 3,400,270, 3,867,628, 4,002,886, 4,201, 471, 4,521,677, 4,717,913, 4,731,529, 4,766,295, 4,847,483, 4,879,756, 4,888,709, 4,937,586, 4,945,225, 4,962,466, 5,019,811, 5,111,196, 5,194,860, 5,241,657, 5,382,824, 5,406,271, EP 0 307 911, WO 86/02477, WO 91/08539, SE 461,690, DE 2,432,402, DE 3,823,007, DE 38 73 231, and GB 2,171,512.

Reference is made to the above patent applications and patents and the above US-patents are hereby incorporated in the present specification by reference. In Applicant's pending European patent application No. 92907631.3 and corresponding pending U.S. patent application Ser. No. 122,474, a specific verification technique is described according to which an electronic price display verifies the authenticity of the price display in question and the proper receipt of the intentional information in relation to the master station through the transmission of a verification signal to the master station. Generally within the above technical fields and in particular within the technical field of transmitting information through an optic link, in particular an infrared link from the master station to an electronic display, specific concerns have to be made in order to ensure proper operation of the entire apparatus or system. Firstly, the power consumption of the electronic price display has to be kept fairly low in order to reduce the power consumption of the self-contained electronic price display. Secondly, due to numerous radiating sources such as the day light or sun light, the radiation from electric light sources including incandescent lamps and fluorescence lamps the electronic circuit of the electronic price display has to be able to discriminate between the background radiation and the modulated light to be received and detected by the electronic circuit. Mains induced background light fluctuations may further influence the receipt of the information by the electronic circuit and has to be clearly discriminated in relation to the intentional modulated light to be received by the electronic circuit. Furthermore, It has to be realized that the background intensity of the light most often is several decades larger than the intensity of the modulated light to be received and detected by the electronic circuit.

Commonly, the electronic circuit includes a photodiode constituting the optic converter element receiving the modulated light In particular the modulated infrared radiation and converts the optic information signal into an information signal. In an electronic equivalence diagramme, the photodiode may be considered constituting a current generator connected in parallel with a diode. Provided the photodiode is exposed to light, the current through the current generator produces a specific voltage drop across the diode in the conducting direction of the diode. The voltage is built up to a certain level corresponding to the diode current derived therefrom being equivalent to the current generated by the current generator less the current derived to the peripheral circuit i.e. the electronic components connected to the photodiode.

In order to reduce the current shunted through the internal diode it is a common practise to bias the photodiode in the reverse direction and measure the current conducted through the biasing circuit by the current generator. As the diode is biased in the reverse direction, the internal diode does not shunt the photo current but gives rise to a reverse current (dark current) which is insignificant in relation to most communication purposes. The dark current may be reduced to approximately 0 mA by providing a biasing circuit maintaining a voltage of approx. 0 V across the photodiode, e.g. by using an operational amplifier in an active current configuration.

However, the prior art biasing circuit reducing a 0 mA dark current through the generation of a 0 V voltage across the photodiode causes the current generated by the diode through the exposure to light to be conducted through the current supply of the apparatus and give origin to a power consumption proportional to the incident light. As the photodiode may generate a current of the order of 0.1 mA through the exposure to background light a corresponding constant current has to be produced by the power supply of the apparatus. In battery powered equipment, a constant current consumption of the order of 0.1 mA is in most applications unacceptable.

SUMMARY OF THE INVENTION

It is an object of the present invention to provide an electronic circuit producing on the one hand a faultless receipt and detection of information by an electronic circuit and on the other hand consumes far less current and power than the prior art electronic circuits.

A further object of the present invention is to provide an electronic circuit providing a reliable discrimination between optic information to be received by the electronic circuit and any background radiation and providing a stable detection of the intentional optic information irrespective of the background radiation and any variation of the background radiation.

A particular feature of the present invention is that the electronic circuit may be implemented in a single custom designed circuit or an ASIC (Application Specific Integrated Circuit) including all semiconductor components including or excluding an optic detector element constituted by a photodiode which may be intregrated in the ASIC or alternatively constitute an external or peripheral component relative to the ASIC.

A particular feature of the present invention relates to a specific implementation of the electronic circuit according to the present invention which constitutes a stable feedback or closed loop detector circuit allowing proper receipt and detection of modulated light of a specific modulation frequency or within a specific modulation frequency range irrespective of the background light radiation or any variation thereof irrespective of the background radiation level in relation to the modulated radiation level.

The above objects, the above advantages and the above features together with numerous other objects, advantages and features which will be evident from the below detailed description of preferred embodiments of the electronic circuit according to the present invention is in accordance with the teachings of the present invention obtained by an electronic circuit for receiving and discriminating modulated light of a specific modulation frequency or within a specific modulation frequency range, comprising:

a photodiode detector means responsive to light incident to the photodiode detector means for generating an electric current signal in response to the light, a controllable shunting means connected in parallel with the photodiode detector means and controllable between a first operational mode in which the electric current generated by the photodiode detector means is shunted by the shunting means and a second operational mode in which the electric current generated by the photodiode detector means is not shunted by the shunting means, and a control circuit means connected to the photodiode detector means and the controllable shunting means for controlling the controllable shunting means into the first operational mode provided the electric current signal generated by the photodiode detector means does not include a signal of the specific modulation frequency or within the specific modulation frequency range, or for controlling the controllable shunting means into the second operational mode provided the electric current signal generated by the photodiode detector means includes a signal of the specific modulation frequency or within the specific modulation frequency range.

According to the basic teachnings of the present invention, the controllable shunting means is provided for shunting the photodiode detector means provided the signal generated by the photodiode detector means does not correspond to the intentional information or signal to be received by the electronic circuit in which instance the current generated by the photodetector means is simply short circuited by the shunt constituted by the controllable shunting means instead of the current generated by the photodiode circuit giving origin to current consumption as the prior art electronic circuits.

It is to be realized that terms or expressions such as shunting, conducting, non-shunting and non-conducting refer to modes or states which in the real world are described by the terms in question. The ideal shunt of course defines a short circuiting in the shunting state and an open circuit in the non-shunting state as the resistance or impedance is zero in the shunting state and the conductance is zero in the non-shunting state In the real world, the shunting or non-shunting and similarly the conducting and non-conducting modes or states refer to finite impedances and conductances which may further constitute varying functions of among others the frequency in question and certain operational parameters. Consequently, the terms shunting and similarly conducting etc. are to be conscrued generic terms referring to the modes or states which do not solely correspond to the physical descriptive ideal phenomena referred to above but any physical phenomena which from a technical point of view may be considered covered by the term or expression in question.

The controlling of the controllable shunting means by means of the control circuit means may in accordance with alternative circuit configurations be constituted in a continuous operational mode as the control circuit controls the controllable shunting means operates in a continuous operation between the first and the second operational modes allowing the electric current generated by the photodiode detector means to be not only shunted or not shunted but also partly shunted as the controllable shunting means is operated in an operational mode in which the current is partly shunted. Alternatively, the controllable shunting means may be controlled by the control circuit means in a distinct on/off operational mode as the control circuit shifts the controllable shunting means between the first and the second operational modes.

According to the present preferred embodiment of the electronic circuit, the controllable shunting means is constituted by a transistor means comprising a gate for controlling the transistor means into the first or alternatively the second operational mode, the first operational mode being constituted by a conducting state of the transistor means and the second state being constituted by a non-conducting operational mode of the transistor means. Providing a simple and reliable implementation of the electronic circuit the transistor means simply constitutes the shunt for shunting the current generated by the photodetector means in the first operational mode as the transistor means is controlled into its conductive state and in the second operational mode allows the current generated by the photodiode detector means to be output from the electronic circuit as the transistor means is in its non-conducting state.

According to alternative embodiments of the electronic circuit according to the present invention, the transistor means may be constituted by any kind of transistor element or a combination thereof including bipolar transitors, FET transistors etc. and preferably MOS FET transistors including P-MOS FET's and N-MOS FET's. According to the presently preferred embodiment of the electronic circuit according to the present invention, the transistor means is simply constituted by a MOS FET transistor and the photodiode detector means being constituted by a photodiode, the MOS FET transistor constituting a P-MOS FET or alternatively an N-MOS FET having a gate, a source and a drain, the gate of the MOS FET constituting the gate of the transistor means and the MOS FET being connected across the photodiode by the source and the drain of the MOS FET.

The substitution of a P-MOS FET by an N-MOS FET or vice versa is as is evident to a person having ordinary skill in the art simply accomplished through simple straightforward inversion of the entire electronic topology.

The control circuit means of the electronic circuit according to the present invention may be constituted by any appropriate controller means including discrete transistor circuits, closed loop amplifier means, gyrators, transconductance amplifiers, etc. In the presently preferred embodiment of the electronic circuit according to the present invention, the controller circuit means comprises a current to voltage converter means having an input and an output, which input is connected to the photodiode detector means and which output constitutes the output of the electronic circuit. Further preferable, the current to voltage converter is constituted by an operational amplifier.

For allowing the electronic circuit according to the present invention to discriminate between the intentional information constituted by the modulated light of the modulation frequency or within the specific modulation frequency range, the control circuit preferably includes a filter block defining a pass band or a stop band, which pass band or alternatively which stop band defines a frequency range containing the specific modulation frequency or containing the specific modulation frequency range. Thus, the control circuit means may be implemented in accordance with well known filtering techniques including analogue and digital filters and/or passive or active filters constituting a transmission filtering block or alteratively a controller or feedback block, thus, according to the presently preferred embodiment of the electronic circuit according to the present invention, the filter block constitutes a feedback branch of the operational amplifier and the filter block defines a stop band containing the specific modulation frequency or the specific modulation frequency range. In this way, undesired signal frequencies, i.e. frequencies different from said specific modulation frequency or within said specific modulation frequency range are suppressed at the output of the electronic circuit, whereas the desired signal frequency or the desired signal frequencies, i.e. frequencies identical to said specific modulation frequency or within said specific modulation frequency range, are passed through the electronic circuit.

According to a particular advantageous and preferred embodiment of the electronic circuit according to the present invention, the filter block and the photodiode detector means connected in parallel with the controllable shunting means are connected in a series configuration which constitutes the feedback branch of the operational amplifier providing a closed loop control circuit means in which the provision of the filter block in the feedback branch suppresses the detection of light by the electronic circuit which light is not modulated by a modulation frequency corresponding to the specific modulation frequency or within the specific modulation frequency range.

The present invention also relates to an electronic price display.

The above objects, the above advantages and the above features together with numerous other objects, advantages and features which will be evident from the below detailed description of preferred embodiments of the electronic price display according to the present invention is in accordance with the teachings of the present invention is obtained by an electronic price display communicating with a master station through an infrared wireless link for receiving information from the master station as modulated infrared light and comprising an electronic circuit for receiving and discriminating such modulated light of a specific modulation frequency or within a specific modulation frequency range, a display circuit communicating with the electronic circuit for displaying information thereon received and discriminated by the electronic circuit, the electronic circuit comprising:

an electronic circuit for receiving and discriminating modulated light of a specific modulation frequency or within a specific modulation frequency range, comprising:

a photodiode detector means responsive to light incident to the photodiode detector means for generating an electric current signal in response to the light, a controllable shunting means connected in parallel with the photodiode detector means and controllable between a first operational mode in which the electric current generated by the photodiode detector means is shunted by the shunting means and a second operational mode in which the electronic photodiode detector means is not shunted by the shunting means, and a control circuit means connected to the photodiode detector means and the controllable shunting means for controlling the controllable shunting means into the first operational mode provided the electric current signal generated by the photodiode detector means does not include a signal of the specific modulation frequency or within the specific modulation frequency range, or for controlling the controllable shunting means into the second operational mode provided the electric current signal generated by the photodiode detector means includes a signal of the specific modulation frequency or within the specific modulation frequency range.

The electronic circuit of the electronic price display according to the present invention may be implemented in accordance with the above described implementations and embodiments of the electronic circuit according to the present invention and the electronic price display according to the present invention preferably includes a digital controller, e.g. microprocessor means communicating with the electronic circuit and the display and controlling the overall operation of the electronic price display.

According to another aspect of the present invention, an electronic circuit is provided for receiving and discriminating modulated light of a specific modulation frequency or within a specific modulation frequency range, comprising:

a photodiode detector means responsive to light indicent to the photodiode detector means for generating an electric current signal in response to the light, a shunting transistor means connected in parallel with the photodiode detector means and having a gate, and an active filter circuit means having an input and an output the input being connected to the photodiode detector means for receiving the electric current signal therefrom, the output being connected to the gate of the shunting transistor means, and the input and the output being interconnected through a filter block defining a pass band and a stop band, the pass band or alternatively the stop band defining a frequency range containing the specific modulation frequency or containing the specific modulation frequency range, and the active filter circuit means including the filter block constituting a closed loop feed forward circuit or a closed loop feed back circuit, respectively.

According to a further aspect of the present invention, an electronic price display is provided which electronic price display communicates with a master station through an infrared wireless link for receiving information from the master station as modulated infrared light and comprising an electronic circuit for receiving and discriminating such modulated light of a specific modulation: frequency or within a specific modulation frequency range, a display circuit communicating with the electronic circuit for displaying information thereon received and discriminated by the electronic circuit, the electronic circuit comprising:

an electronic circuit for receiving and discriminating modulated light of a specific modulation frequency or within a specific modulation frequency range, comprising:

a photodiode detector means responsive to light indicent to the photodiode detector means for generating an electric current signal in response to the light, a shunting transistor means connected in parallel with the photodiode detector means and having a gate, and an active filter circuit means having an input and an output the input being connected to the photodiode detector means for receiving the electric current signal therefrom, the output being connected to the gate of the shunting transistor means, and the input and the output being interconnected through a filter block defining a pass band and a stop band, the pass band or alternatively the stop band defining a frequency range containing the specific modulation frequency or containing the specific modulation frequency range, and the active filter circuit means including the filter block constituting a closed loop feed forward circuit or a closed loop feed back circuit, respectively.

BRIEF DESCRIPTION OF THE DRAWINGS

The present invention will now be further described with reference to the drawings, in which.

DETAILED DESCRIPTION OF THE INVENTION

Figure 1:
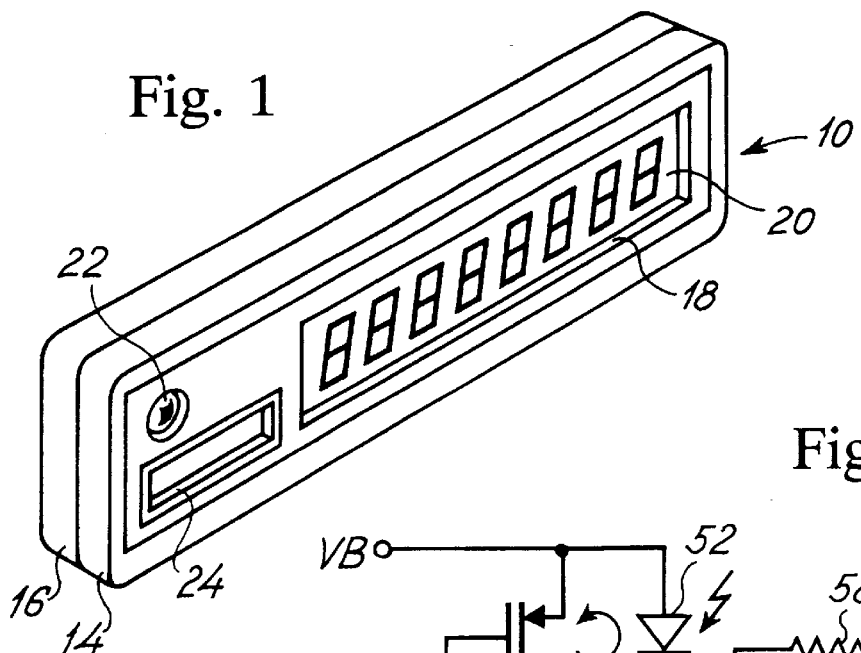
FIG. 1 is a perspective and schemative view of an electronic price display comprising an electronic circuit according to the present invention.

In FIG. 1, a price display 10 is shown constituting a self supported electronic apparatus communicating with a master station or back office computer for receiving information therefrom and displaying information to customers in e.g. a supermarket or any other shop as described in the above mentioned numerous patents and patent applications. The apparatus 10 comprises a housing 12 composed of two components, a front component 14 and a rear component 16. The front and rear components 14 and 16 together define an interior space in which an electronic circuit according to the present invention and additional electronic circuits are received and supported on a printed circuit board constituting a single, a double sided or a multilayer printed circuit board or alternatively a thick or thin film layer substrate e.g. deposited on a display as is well known in the art per se. The electronic circuits may in accordance with well known technical principles be implemented by combining the PCB and thick and/or thin layer techniques as is well known in the art per se. The front and rear components 14 and 16, respectively, are locked together in e.g. a snap-fitting closure or alternatively by employing screws or similar fixation means for locking the two components together defining the housing of the electronic price display 10. The housing defined by the front and rear components 14 and 16 is of an elongated and slim configuration allowing the electronic price display to be mounted on the front panel of e.g. a shelter or similar exposure element on which specific elements are disclosed and presented to a customer. In the front surface of the front element 14, an elongated aperture 18 of an overall rectangular configuration is defined in which an 8-digit electronic display 20 is exposed. The 8-digit display 20 is preferably implemented in LCD or any other well known display technique and serve the purpose of displaying information, in particular the price of a specific good to a customer or customers. Different display elements such as LED's or any different alfanumeric display may be used in the price display 10.

In the front surface of the front component 14, a photodiode 22 constituting an electronic component of the electronic circuit according to the present invention is exposed together with a further optical element 24 which may constitute a light emitting diode or alternatively and preferably a bar code reader allowing the price display 10 to read information from a product by scanning the bar code of the product. The photodiode 22 basically serves the purpose of receiving infrared light from an infrared light emitter emitting information from the above mentioned master station or back office computer. In accordance with the techniques described in applicant's European patent application No. 92907631.3 and similar in applicant's U.S. patent application Ser. No. 122,474, the price display preferably further contains an infrared light emitter for emitting a verification signal to the price display master controller. Optionally, as described in Applicant's above mentioned European and U.S. patent applications, the price display 10 may further communicate with a local emitter and receiver such as a hand-held apparatus including an emitter and receiver for inputting information locally to the price display 10.

Figure 6:
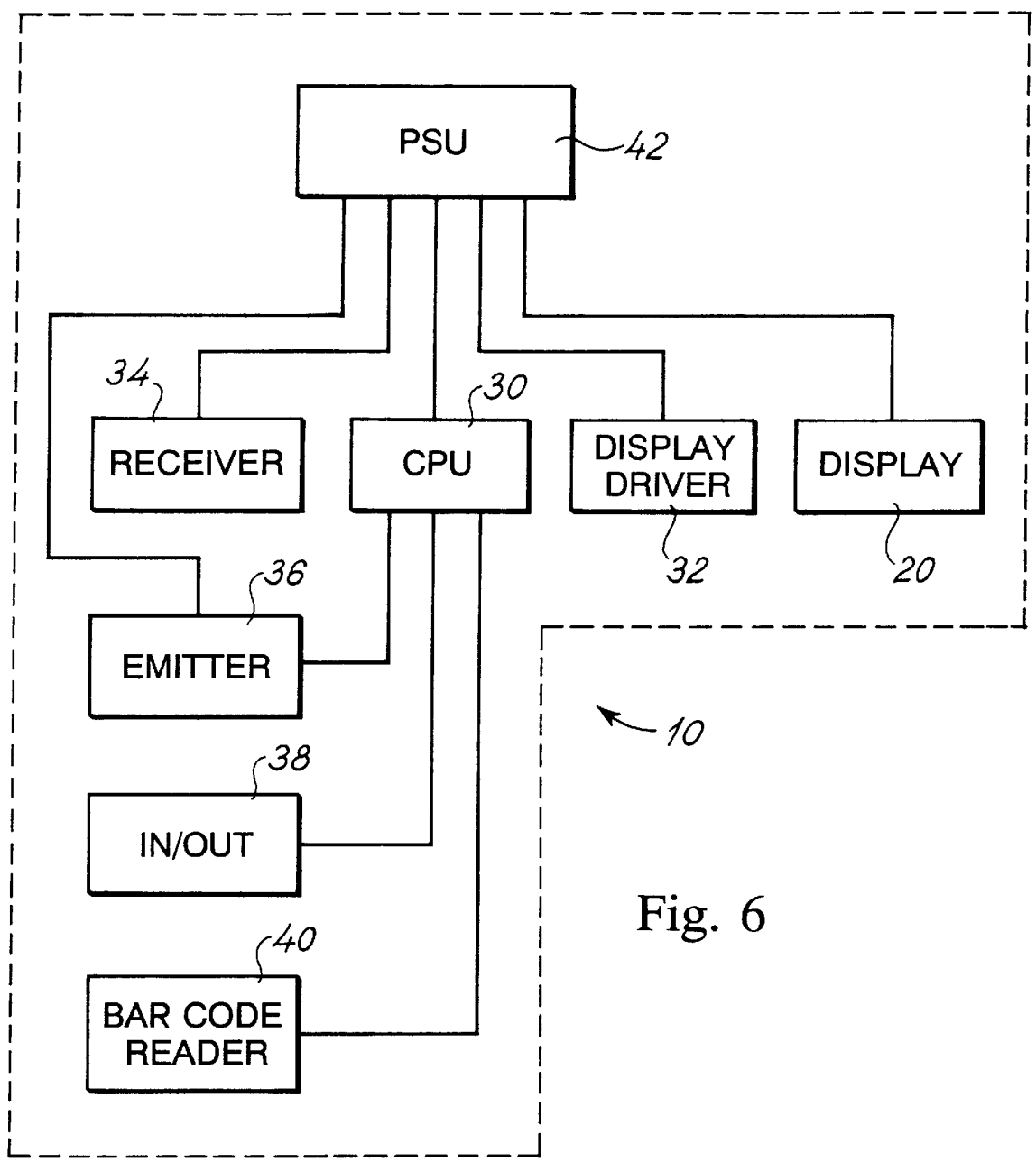
FIG. 6 is a block diagrammatic view of the overall electronic circuitry of the price display of FIG. 1.

In FIG. 6, the overall electronic circuit of the price display 10 shown in FIG. 1 is illustrated serving the sole purpose of describing in general the main circuit components of the price display. The price display centrally comprises a CPU block 30 constituted by a microprocessor communicating with peripheral in-out gates etc. as is well known in the art or preferably dedicated digital hardware. The CPU block 30 controls the display 20 of the price display 10 as the CPU block communicates with a display driver block 32 which further communicates with the display 20. The CPU block 20 also receives information from a receiver block 34 which includes an electronic circuit implemented in accordance with the teachings of the present invention and receives modulated infrared radiation emitters controlled by the above mentioned master station. The CPU block 30 further communicates with an emitter block 36 for allowing the verification signal described in Applicant's above mentioned European and U.S. patent applications to be retransmitted to the master station. The CPU may further optionally communicate with additional peripheral elements such as a hard wire in/out block 38 through which information may be input to the CPU block and output from the CPU block, respectively, through hard wire data communication links such as an RS232 connection. Furthermore or alternatively, the CPU block 30 may communicate with a bar code reader block 40 including an optic detector exposed constituting the above described further optic electronic element 24 and serving the purpose of reading a bar code from a specific product for inputting the specific information concerning the product in question through the reading of the bar code.

The electronic circuitry shown in FIG. 6 also comprises a power supply unit block 42 powering all blocks of the electronic circuitry as is evident from FIG. 6.

Figure 2:
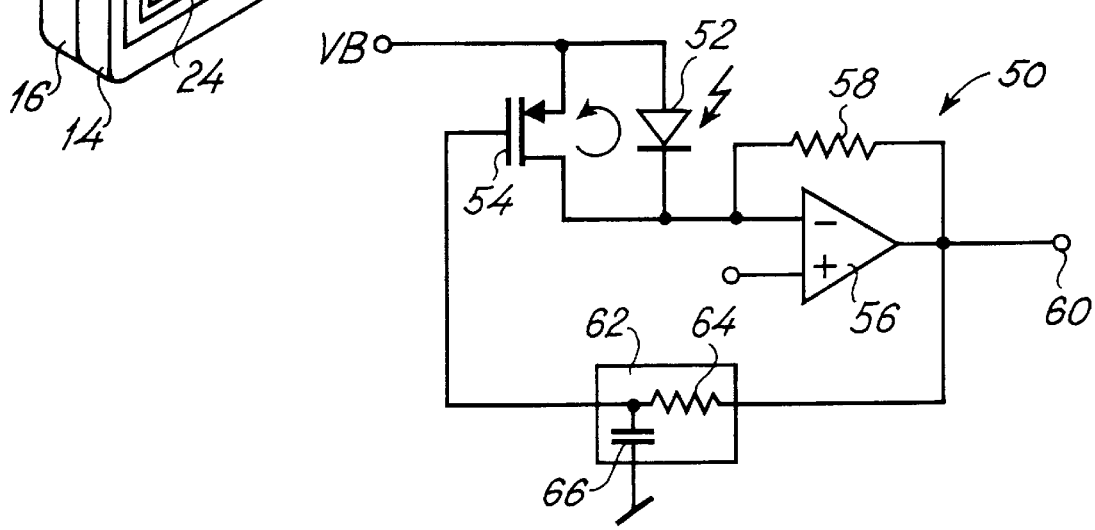
FIG. 2 is a diagrammatic view of a first embodiment of the electronic circuit according to the present invention.

In FIG. 2, a first embodiment of an electronic circuit according to the present invention is shown, constituting an infrared detector and discriminating circuit. The circuit is in its entirety designated the reference numeral 50 and centrally comprises a photodiode 52 which is sensitive to infrared radiation and constitutes an infrared detector. The anode of the infrared detector or photodiode 52 is connected to the drain of a P-MOS FET (metal oxide semiconductor field effect transistor) 54 and the cathode of the photodiode 52 is connected to the source of the P-MOS FET 54. The anode of the photodiode 52 and the drain of the P-MOS FET 54 are connected to a positive voltage rail VB and the cathode of the photodiode 52 and the source of the P-MOS FET 54 are connected to an inverting input of an operational amplifier 56, the output of which constitutes the detector output 60 of the electronic circuit 50. The output of the operational amplifier 56 is connected to the inverting input thereof through a feedback resistor 58. The output of the operational amplifier 56 is connected through an RC filter block 62 to the gate of the P-MOS FET 54. The RC filter block 62 includes a resistor 64 and a capacitor 66 and constitutes a low-pass filter. The non-inverting input of the operational amplifier 56 is kept on a voltage level of the order of 20–100 mV, such as 50–100 mV below the positive voltage VB.

The electronic circuit 50 basically constitutes a combined photodiode shunting and active filter circuit functioning in the following manner. Provided the photodiode 52 is exposed to infrared light of a specific frequency, the photodiode generates a voltage in response to the incident light which voltage of the specific frequency is supplied to the inverting input of the operational amplifier 56. The photodiode 52 is shunted by the P-MOS FET 54 and is biased in the forward direction constituting a current generator the gate of which is connected to the output of the operational amplifier 56 through the filter block 62. Provided the frequency of the infrared light detected by the photodiode 52 is within the pass band frequency range defined by the filter block 62, the detection is suppressed as the P-MOS FET 54 is modulated and shunts the photodiode 52 whereas in case the frequency of the infrared light detected by the photodiode 52 is outside the pass band frequency range defined by the filter block 62, the P-MOS FET 54 is not modulated allowing the current generated by the photodiode 52 to be detected and output from the output 60 of the electronic circuit 50. It is to be realized that the shunting of the photodiode 52 by means of the P-MOS FET 54 reduces the current and power consumption of the overall electronic circuitry as the current generated by the photodiode due to exposure to light is shunted by the P-MOS FET 54, provided the current generated by the photodiode 54 contains frequency components exclusively within the pass band frequency range defined by the filter block 62 and, thus, short circuits the photodiode 52 preventing the current generated by the photodiode 52 to be transmitted to the electronic components connected to the photodiode 52 giving origin to a current drain from the power supply. Provided the current generated by the photodiode 52 contains frequencies within the relevant frequency range, i.e. outside the pass band frequency range defined by the filter block 62, the P-MOS FET 54 is not modulated and the current generated by the photodiode 52 is conducted to the operational amplifier 56 and output from the output 60.

Furthermore, it is to be realized that the electronic circuit of FIG. 2 constitute an active feedback filter circuit which on the one hand eliminates the detection of infrared signals outside a specific pass band and on the other hand suppresses current generation by the infrared detector by frequencies within the pass band frequency range defined by the filter block 62 consequently reducing the current consumption of the overall electronic circuitry by preventing the photodiode 52 from draining current from the positive voltage supply rail Vb and consequently from the power supply as compared to an electronic circuit which includes an input or first stage and a separate or second filter stage and in which the detected signals are filtered by means of active or passive filters of the second stage. It is further to be realized that the electronic circuit of FIG. 2 due to its active feedback filter configuration allows the suppression of infrared signals of even extremely high levels outside the pass bared which might else give origin to overload of the electronic circuit.

The electronic circuit 50 described above With reference to FIG. 2 may be modified in numerous ways, e.g. by altering the low pass RC filter block 62 into a high pass or a pass band filter, an LC or LCR filter or any active or passive filter, as is well known within the technique per se for allowing the electronic circuit to detect specific infrared signal frequencies within a specific pass band, or alternatively below a cut-off frequency determined by a high pass filter constituted e.g. by a CR or LC filter block. Also the adaptation of the filter block 62 to specific requirements allows the detector and discriminator circuit to suppress specific infrared signal frequencies.

Figure 4:
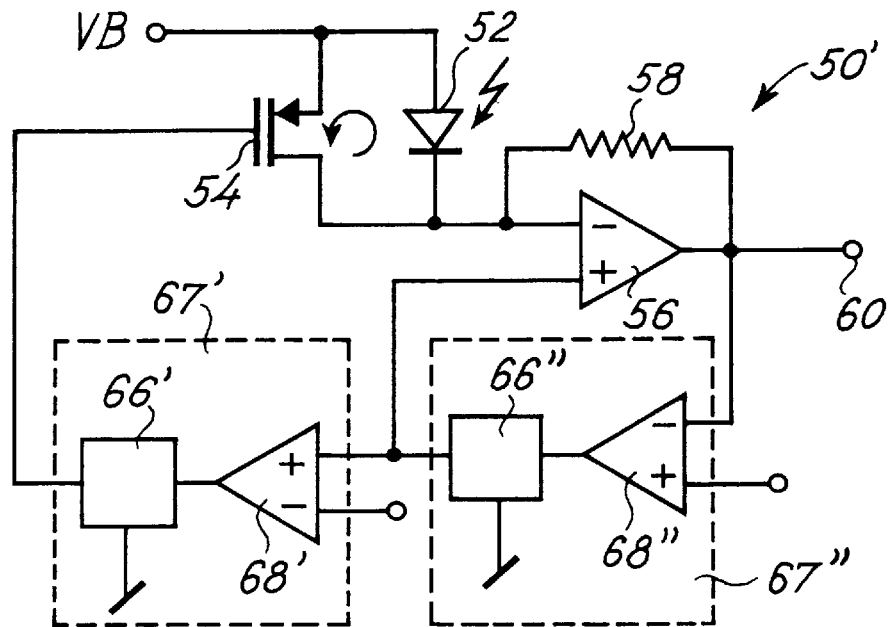
FIG. 4 is a diagrammatic view of an alternativ implementation or a second embodiment of the electronic circuit according to the present invention.
Figure 5:
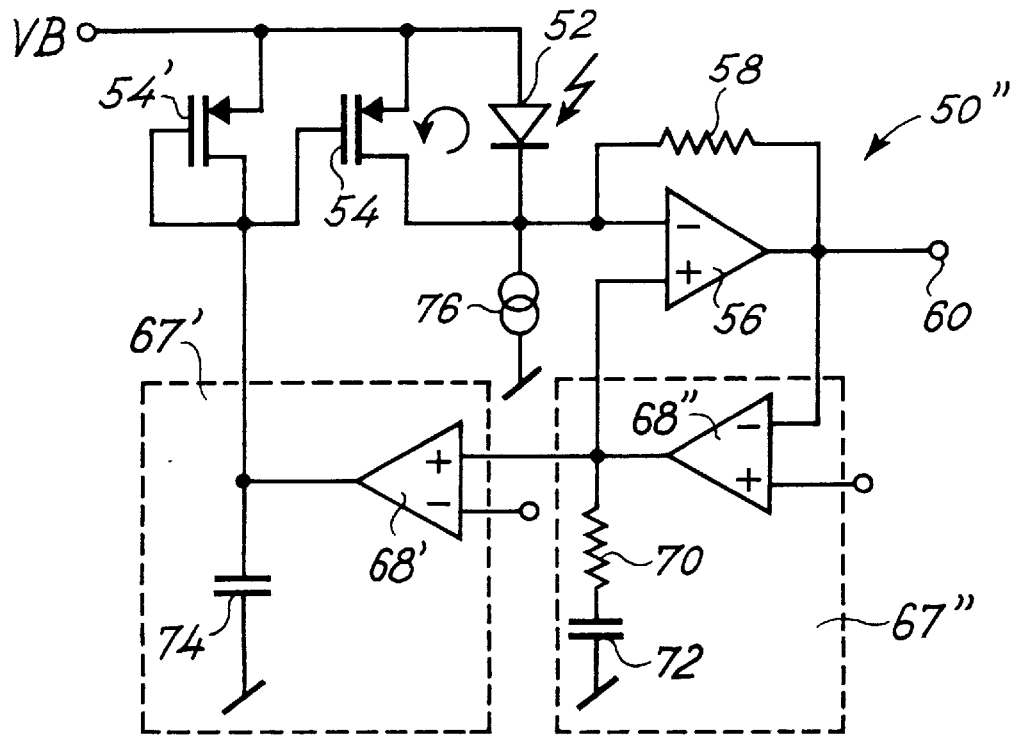
FIG. 5 is a diagrammatic view of a further alternative implementation or a third and presently preferred embodiment of the electronic circuit according to the present invention.

The electronic circuit 50 shown in FIG. 2 may be further modified as is illustrated in FIGS. 4 and 5 by the addition of supplementary components. In FIG. 4, a second embodiment of the electronic circuit according to the present invention is shown designated the reference numeral 50' in its entirety. The electronic circuit 50' differs from the above described first embodiment 50 shown in FIG. 2 in that the feedback low pass filter block 66 is substituted by two filter blocks 66' and 66" which may be implemented as low pass, band pass or high pass filter blocks for fulfilling specific detection and discrimination purposes as discussed above and which are included in active filter circuit blocks 67' and 67", respectively, including separate filter amplifiers 68' and 68", respectively, which may be implemented as operational amplifiers or alternatively and preferably transconductance amplifiers. The provision of two separate filter amplifiers 68' and 68" further allows that the forward bias of the photodiode 52 may be adjusted by applying a specific voltage to the inverting input of the filter amplifier 68' of a voltage level slightly lower than the voltage VB such as a level of 20–100 mV, e.g. 50–100 mV below the voltage VB and at the same time through the supply of a biasing voltage to the non-inverting input of the filter amplifier 68" for adjusting the non-inverting input of the operational amplifier 56 to a specific preset level and consequently adjusting the inverting input of the operational amplifier to a specific preset level maintaining the cathode of the photodiode 52 at said specific preset level of the inverting input of the operational amplifier 56.

In FIG. 5, a further modified and presently preferred embodiment of the electronic circuit according to the present invention is shown designated the reference numeral 50" in its entirety. The electronic circuit 50" basically differs from the above described second embodiment 50' in that a further P-MOS FET 54' is provided constuting a current mirror relative to the P-MOS FET 54 which is constituted by a high gain P-MOS FET. As is evident from FIG. 5, the filter block 66' and 66" are furthermore constituted by a capacitor 74 and the series configuration of a resistor 70 and a capacitor 72, respectively. A low level current generator 76 is further provided and connected to the cathode of the photodiode 52 in order to prevent complete cut off of the shunt in case of offset voltage variations and extremely low incident background light levels, i.e. in order to ensure that the feed back loop of the electronic circuit is always active.

The electronic circuit 50" shown in FIG. 4 is at present being implemented by the applicant as an ASIC.

The electronic circuit according to the present invention provides the basic advantage of providing an electronic circuit which is capable of receiving optic information of a specific frequency and suppressing optic information of any irrelevant frequency range. According to the basic filtering concept of the electronic circuit according to the present invention, e.g. any change of indicent background light radiation originating from artificial light sources or the sun may be suppressed without giving origin to any significant change of operational conditions of the overall electronic circuit and in particular without giving origin to current and power consumption and overload of the electronic circuit and similarly light modulations or fluctuations originating from the mains frequency or harmonics of the mains frequency may be suppressed through the adaptation of the active filter or feedback filtering concept according to the present invention.

Figure 3A:
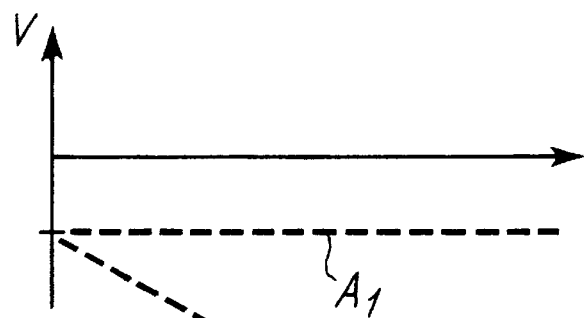
FIG. 3a is a diagrammatic view illustrating the instantaneous value of the output signal from the electronic circuit of FIG. 2 as a function of the instantaneous value of the intensity of the incident light having frequencies in or outside a specific pass band frequency range.
Figure 3B:
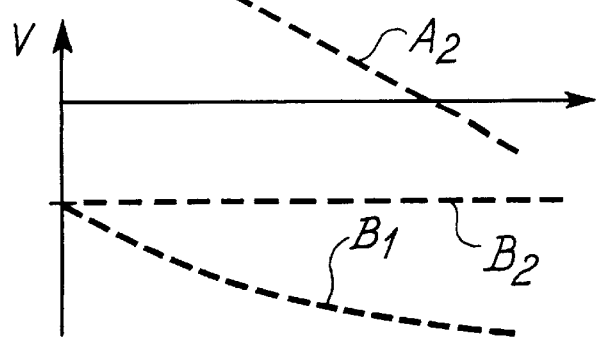
FIG. 3b is a diagrammatic view similiar to the view of FIG. 3a illustrating the instantaneous shunt transistor gate signal as a result of the internal feedback of the circuit of FIG. 2.

In FIGS. 3a and 3b, two diagrammes are shown illustrating the suppression capability of the electronic circuit according to the present invention which diagrammes were recorded by means of a prototype implementation of the electronic circuit 50" shown in FIG. 5. In FIG. 3a, two curves A1 and A2 are shown and similarly in FIG. 3b, two curves B1 and B2 are shown. The curves A1 and B1 belong together and similarly the curves A2 and B2 belong together meaning that the curves A1, B1 and the curves A2, B2 were recorded simultaneously. The curves shown in FIG. 3a represent two different output voltages supplied from the output 60 of the electronic circuit, and the curves shown in FIG. 3b represent the gate voltages present on the P-MOS FET 54. The curves represent instantaneous values dependent on the instantaneous light intensity of the incident light to which the photodiode 52 is exposed. The curves A1 and B1 represent the situation in which the incident light to which the photodiode 52 is exposed has a modulation frequency below the cut off frequency of the electronic circuit 50" whereas the curves A2 and B2 represent the situation in which the light to which the photodiode 52 is exposed has a modulation frequency within the discrimination range of the electronic circuit 50", i.e. within the intentional transmission and discrimination range of the electronic circuit 50".

As is evident from FIG. 3a, the curve A1 represent a constant voltage supplied from the output of the electronic circuit 50", i.e. from the output 60 which voltage is determined by the biasing voltage supplied to the operational amplifier 56 as described above and independent on the variation of intensity of the incident light to which the photodiode 52 is exposed which light has a modulation frequency outside the discrimination or detection band of the electronic circuit 50".

The curve B1 similarly illustrate the gate voltage supplied to the gate of the P-MOS FET 54 through which gate voltage the photodiode current is shunted by means of the P-MOS FET 54 in accordance with the shunting technique characteristic of the present invention. Provided the light to which the photodiode 52 is exposed has a modulation frequency within the discrimination or detection band of the electronic circuit 50", the output of the electronic circuit 50", i.e. the output 60, generates an output voltage in response to the variation of the incident light as represented by the curve A2 and at the same time the gate voltage of the P-MOS FET 54 is kept constant at the level represented by the curve B2.

It is to be realized that the output voltage defined by the curve A1 represent the output voltage of the operational amplifier 56 as described above whereas the offset voltage represented by the curve B2 represents the offset voltage present on the gate of the P-MOS FET 54 generated by the offset voltages supplied to the non-inverting and inverting inputs, respectively, of the transconductance amplifiers 58" and 58', respectively. The offset voltage represented by the curve B2 may also be influenced by the low level current generator 76 described above.

In the prototype implementation of the electronic circuit 50" shown in FIG. 5, the below components were utilized:

VB=950 mV

Transistor 54: W=2772$\mu$, L=2$\mu$

Transistor 54': W=3$\mu$, L=20$\mu$

Photodiode 52: BPW 34SF

Resistor 58: 2M$\Omega$

Operational amplifier 56: A=$10^6$

Transconductance amplifier 68": gm=2.0 $\mu$S, bias 950 mV

Transconductance amplifier 68': gm=2.0 $\mu$S, bias 900 mV

Resistor 70: 10 k$\Omega$

Capacitor 72: 2.2 nF

Capacitor: 74: 820 pF

Current generator 76: 50 nA

What is claimed is:

1. An electronic circuit for receiving and discriminating modulated light of a specific modulation frequency or within a specific modulation frequency range, comprising:

a photodiode detector means responsive to light incident to said photodiode detector means for generating an electric current signal in response to said light;

a controllable shunting means connected in parallel with said photodiode detector means and controllable between a first operational mode in which said electric current generated by said photodiode detector means is shunted by said shunting means and a second operational mode in which said electric current generated by said photodiode detector means is not shunted by said shunting means; and a control circuit means connected to said photodiode detector means and said controllable shunting means for modulating said controllable shunting means between said first operational mode and said second operational mode, provided said electric current signal generated by said photodiode detector means does not include a signal of said specific modulation frequency or within said specific modulation frequency range, and provided said electric current signal generated by said photodiode detector means includes a signal of said specific modulation frequency or within said specific modulation frequency range, respectively.

2. The electronic circuit according to claim 1, wherein said controllable shunting means includes transistor means comprising a gate for controlling said transistor means into said first or said second operational mode, said first operational mode being constituted by a conducting operational mode of said transistor means and said second operational mode being constituted by a non-conducting operational mode of said transistor means.

3. The electronic circuit according to claim 2, wherein said transistor means includes a MOS FET transistor, and wherein said photodiode detector means includes a photodiode, said MOS FET transistor constituting a P-MOS FET having a gate, a source and a drain, said gate of said P-MOS FET constituting said gate of said transistor means and said P-MOS FET being connected across said photodiode by said source and said drain of said P-MOS FET.

4. The electronic circuit according to claim 2, wherein said transistor means includes a MOS FET transistor and said photodiode detector means includes a photodiode, said MOS FET transistor constituting an N-MOS FET having a gate, a source and a drain, said gate of said N-MOS FET constituting said gate of said transistor means and said N-MOS FET being connected across said photodiode by said source and said drain of said N-MOS.

5. The electronic circuit according to claim 2, wherein said control circuit means further comprises a current to voltage converter means having an input and an output, said input being connected to said photodiode detector means and said output constituting the output of said electronic circuit.

6. The electronic circuit according to claim 5, wherein said current to voltage converter includes an operational amplifier.

7. The electronic circuit according to claim 2, wherein said control circuit means includes a filter block defining a pass band, said pass band defining a frequency range containing said specific modulation frequency or containing said specific modulation frequency range.

8. The electronic circuit according to claim 2, wherein said control circuit means includes a filter block defining a stop band, said stop band defining a frequency range containing said specific modulation frequency or containing said specific modulation frequency range.

9. The electronic circuit according to claim 1, wherein said control circuit means further comprises a current to voltage converter means having an input and an output, said input being connected to said photodiode detector means and said output constituting the output of said electronic circuit.

10. The electronic circuit according to claim 9, wherein said current to voltage converter includes an operational amplifier.

11. The electronic circuit according to claim 1, wherein said control circuit means including a filter block defining a pass band, said pass band defining a frequency range containing said specific modulation frequency or containing said specific modulation frequency range.

12. The electronic circuit according to claim 1, wherein said control circuit means includes a filter block defining a stop band, said stop band defining a frequency range containing said specific modulation frequency or containing said specific modulation frequency range.

13. An electronic circuit for receiving and discriminating modulated light of a specific modulation frequency or within a specific modulation frequency range, comprising:
    a photodiode detector means responsive to light incident to said photodiode detector means for generating an electric current signal in response to said light;
    a controllable shunting means connected in parallel with said photodiode detector means and controllable between a first operational mode in which said electric current generated by said photodiode detector means is shunted by said shunting means and a second operational mode in which said electric current generated by said photodiode detector means is not shunted by said shunting means; and
    a control circuit means connected to said photodiode detector means and said controllable shunting means for modulating said controllable shunting means between said first operational mode and said second operational mode, provided said electric current signal generated by said photodiode detector means does not include a signal of said specific modulation frequency or within said specific modulation frequency range, and said electric current signal generated by said photodiode detector means includes a signal of said specific modulation frequency or within said specific modulation frequency range, respectively;
    said controllable shunting means being including a transistor means comprising a gate for controlling said transistor means into said first or said second operational mode, said first operational mode being constituted by a conducting operational mode of said transistor means and said second operational mode being constituted by a non-conducting operational mode of said transistor means;
    said control circuit means comprising a current to voltage converter means having an input and an output, said input being connected to said photodiode detector means and said output constituting the output of said electronic circuit, said current to voltage converter including an operational amplifier, said control circuit means including a filter block, and said filter block constituting a feedback branch of said operational amplifier and said filter block defining a frequency range containing said specific modulation frequency or said specific modulation frequency range.

14. The electronic circuit according to claim 13, wherein said filter block and said photodiode detector means are connected in a series configuration in parallel with said controllable shunting means constituting said feedback branch of said operational amplifier.

15. An electronic circuit for receiving and discriminating modulated light of a specific modulation frequency or within a specific modulation frequency range, comprising:
    a photodiode detector means responsive to light incident to said photodiode detector means for generating an electric current signal in response to said light;
    a shunting transistor means connected in parallel with said photodiode detector means and having a gate; and
    an active filter circuit means having an input and an output, said input being connected to said photodiode detector means for receiving said electric current signal therefrom, said output being connected to said gate of said shunting transistor means, and said input and said output being interconnected through a filter block defining a frequency range, said frequency range containing said specific modulation frequency or containing said specific modulation frequency range, and said active filter circuit means including said filter block constituting a closed loop feed forward circuit or a closed loop feed back circuit, respectively.

16. The electronic circuit according to claim 15, wherein said transistor means comprises a gate for controlling said transistor means into said first or said second operational mode, said first operational mode being constituted by a conducting operational mode of said transistor means and said second operational mode being constituted by a non-conducting operational mode of said transistor means.

17. The electronic circuit according to claim 16, wherein said transistor means includes a MOS FET transistor and said photodiode detector means includes a photodiode, said MOS FET transistor constituting a P-MOS FET having a gate, a source and a drain, said gate of said P-MOS FET constituting said gate of said transistor means and said P-MOS FET being connected across said photodiode by said source and said drain of said P-MOS FET.

18. The electronic circuit according to claim 16, wherein said transistor means includes a MOS FET transistor and said photodiode detector means includes a photodiode, said MOS FET transistor constituting an N-MOS FET having a gate, a source and a drain, said gate of said N-MOS FET constituting said gate of said transistor means and said N-MOS FET being connected across said photodiode by said source and said drain of said N-MOS FET.

19. The electronic circuit according to claim 16, wherein said active filter circuit means further comprises a current to voltage converter means having an input and an output, said input being connected to said photodiode detector means and said output constituting the output of said electronic circuit.

20. The electronic circuit according to claim 19, wherein said current to voltage converter includes an operational amplifier.

21. The electronic circuit according to claim 16, wherein said active filter circuit means includes a filter block defining a pass band, said pass band defining said frequency range containing said specific modulation frequency or containing said specific modulation frequency range.

22. The electronic circuit according to claim 16, wherein said active filter circuit means includes a filter block defining a stop band, said stop band defining a frequency range containing said specific modulation frequency or containing said specific modulation frequency range.

23. The electronic circuit according to claim 15, wherein said active filter circuit means further comprises a current to voltage converter means having an input and an output, said input being connected to said photo diode detector means and said output constituting the output of said electronic circuit.

24. The electronic circuit according to claim 23, wherein said current to voltage converter includes an operational amplifier.

25. The electronic circuit according to claim 15, wherein said active circuit means includes a filter block defining a pass band, said pass band defining said frequency range containing said specific modulation frequency or containing said specific modulation frequency range.

26. The electronic circuit according to claim 15, wherein said active filter circuit means includes a filter block defining a stop band, said stop band defining said frequency range containing said specific modulation frequency or containing said specific modulation frequency range.

27. An electronic circuit for receiving and discriminating modulated light of a specific modulation frequency or within a specific modulation frequency range, comprising:

a photodiode detector means responsive to light incident to said photodiode detector means for generating an electric current signal in response to said light;

a shunting transistor means connected in parallel with said photodiode detector means and having a gate; and an active filter circuit means having an input and an output, said input being connected to said photodiode detector means for receiving said electric current signal therefrom, said output being connected to said gate of said shunting transistor means, and said input and said output being interconnected through a filter block defining a frequency range, said frequency range containing said specific modulation frequency or containing said specific modulation frequency range, and said active filter circuit means including said filter block constituting a closed loop feed forward circuit or a closed loop feed back circuit, respectively;

said transistor means comprising a gate for controlling said transistor means into first or said second operational modes, said first operational mode being constituted by a conducting operational mode of said transistor means and said second operational mode being constituted by a non conducting operational mode of said transistor means;

said active filter circuit means comprising a current to voltage converter means having an input and an output, said input being connected to said photodiode detector means and said output constituting the output of said electronic circuit; and said current to voltage converter including an operational amplifier.

28. The electronic circuit according to claim 27, wherein said filter block and said photodiode detector means are connected in a series configuration in parallel with said controllable shunting means constituting said feedback branch of said operational amplifier.

29. An electronic circuit for receiving and discriminating modulated light of a specific modulation frequency or within a specific modulation frequency range, comprising:

a photodiode detector means responsive to light incident to said photodiode detector means and biased in its forward direction for generating an electric current signal in response to said light;

a shunting transistor means connected in parallel with said photodiode detector means and having a gate; and an active filter circuit means having an input and an output, said input being connected to said photodiode detector means for receiving said electric current signal therefrom, said output being connected to said gate of said shunting transistor means, and said input and said output being interconnected through a filter block defining a frequency range containing said specific modulation frequency or containing said specific modulation frequency range, and said active filter circuit means including said filter block constituting a closed loop circuit, and said active filter circuit means modulating said shunting transistor means so as to cause said shunting transistor means (a) to shunt said photodiode means, provided said electric current signal generated by said photodiode detector means is not a signal of said specific modulation frequency or within said specific modulation frequency range, or (b) not to shunt said photodiode detector means, provided said electric current signal general by said photodiode detector means is a signal of said specific modulation frequency or within said specific modulation frequency range.

30. The electronic circuit according to claim 29, wherein said transistor means comprises a gate for controlling said transistor means into said first or said second operational mode, said first operational mode being constituted by a conducting operational mode of said transistor means and said second operational mode being constituted by a non-conducting operational mode of said transistor means.

31. The electronic circuit according to claim 30, wherein said transistor means includes a MOS FET transistor and said photodiode detector means includes a photodiode, said MOS FET transistor constituting a P-MOS FET having a gate, a source and a drain, said gate of said P-MOS FET constituting said gate of said transistor means and said P-MOS FET being connected across said photodiode by said source and said drain of said P-MOS FET.

32. The electronic circuit according to claim 30, wherein said transistor means includes a MOS FET transistor and said photodiode detector means includes a photodiode, said MOS FET transistor constituting an N-MOS FET having a gate, a source and a drain, said gate of said N-MOS FET constituting said gate of said transistor means and said N-MOS FET being connected across said photodiode by said source and said drain of said N-MOS FET.

33. The electronic circuit according to claim 30, wherein said active filter circuit means further comprises a current to voltage converter means having an input and an output, said input being connected to said photodiode detector means and said output constituting the output of said electronic circuit.

34. The electronic circuit according to claim 33, wherein said current to voltage converter includes an operational amplifier.

35. The electronic circuit according to claim 30, wherein said filter block defines a pass band, said pass band defining a frequency range containing said specific modulation frequency or containing said specific modulation frequency range.

36. The electronic circuit according to claim 30, wherein said filter block defines a stop band, said stop band defining a frequency range containing said specific modulation frequency or containing said specific modulation frequency range.

37. The electronic circuit according to claim 29, wherein said active filter circuit means further comprises a current to voltage converter means having an input and an output, said input being connected to said photodiode detector means and said output constituting the output of said electronic circuit.

38. The electronic circuit according to claim 37, wherein said current to voltage converter includes an operational amplifier.

39. The electronic circuit according to claim 29, wherein said filter block defines a pass band, said pass band defining a frequency range containing said specific modulation frequency or containing said specific modulation frequency range.

40. The electronic circuit according to claim 29, wherein said filter block defines a stop band, said stop band defining a frequency range containing said specific modulation frequency or containing said specific modulation frequency range.

41. An electronic circuit for receiving and discriminating modulated light of a specific modulation frequency or within a specific modulation frequency range, comprising:

a photodiode detector means responsive to light incident to said photodiode detector means and biased in its forward direction for generating an electric current signal in response to said light;

a shunting transistor means connected in parallel with said photodiode detector means and having a gate; and an active filter circuit means having an input and an output, said input being connected to said photodiode detector means for receiving said electric current signal therefrom, said output being connected to said gate of said shunting transistor means, and said input and said output being interconnected through a filter block defining a frequency range containing said specific modulation frequency or containing said specific modulation frequency range, and said active filter circuit means including said filter block constituting a closed loop circuit, and said active filter circuit means modulating said shunting transistor means so as to cause said shunting transistor means (a) to shunt said photodiode means, provided said electric current signal generated by said photodiode detector means is not signal of said specific modulation frequency or within said specific modulation frequency range or (b) not to shunt said photodiode detector means, provided said electric current signal general by said photodiode detector means is a signal of said specific modulation frequency or within said specific modulation frequency range;

said shunting transistor means comprising a gate for controlling said transistor means into first or said second operational modes, said first operational mode being constituted by a conducting operational mode of said transistor means and said second operational mode being constituted by a non-conducting operational mode of said transistor means;

said active filter circuit means comprising a current to voltage converter means having an input and an output, said input being connected to said photodiode detector means and said output constituting the output of said electronic circuit; and said current to voltage converter including an operational amplifier.

42. The electronic circuit according to claim 41, wherein said filter block and said photodiode detector means being connected in a series configuration in parallel with said controllable shunting means constituting said feedback branch of said operational amplifier.

43. An electronic price display communicating with a master station through an infrared wireless link for receiving information from said master station as modulated infrared light, said display comprising:

an electronic circuit for receiving and discriminating such modulated light of a specific modulation frequency or within a specific modulation frequency range; and a display circuit communicating with said electronic circuit for displaying information thereon received and discriminated by said electronic circuit;

wherein said electronic circuit comprises:

a photodiode detector means responsive to light incident to said photodiode detector means for generating an electric current signal in response to said light;

a controllable shunting means connected in parallel with said photodiode detector means and controllable between a first operational mode in which said electric current generated by said photodiode detector means is shunted by said shunting means and a second operational mode in which said electric current generated by said photodiode detector means is not shunted by said shunting means; and a control circuit means connected to said photodiode detector means and said controllable shunting means for modulating said controllable shunting means between said first operational mode and said second operational made, provided said electric current signal generated by said photodiode detector means does not include a signal of said specific modulation frequency or within said specific modulation frequency range, and provided said electric current signal generated by said photodiode detector means includes a signal of said specific modulation frequency or within said specific modulation frequency range, respectively.

44. An electronic price display communicating with a master station through an infrared wireless link for receiving information from said master station as modulated infrared light, said display comprising:

an electronic circuit for receiving and discriminating such modulated light of a specific modulation frequency or within a specific modulation frequency range; and a display circuit communicating with said electronic circuit for displaying information thereon received and discriminated by said electronic circuit;

wherein said electronic circuit comprises:

a photodiode detector means responsive to light incident to said photodiode detector means for generating an electric current signal in response to said light;

a controllable shunting means connected in parallel with said photodiode detector means and controllable between a first operational mode in which said electric current generated by said photodiode detector means is shunted by said shunting means and a second operational mode in which said electric current generated by said photodiode detector means is not shunted by said shunting means;

a control circuit means connected to said photodiode detector means and said controllable shunting means for modulating said controllable shunting means between said first operational mode and said second operational mode provided said electric current signal generated by said photodiode detector means does hot include a signal of said specific modulation frequency or within said specific modulation frequency range, and said electric current signal generated by said photodiode detector means includes a signal of said specific modulation frequency or within said specific modulation frequency range, respectively;

said controllable shunting means including a transistor means comprising a gate for controlling said transistor means into said first or said second operational mode, said first operational mode being constituted by a conducting operational mode of said transistor means and said second operational mode being constituted by a non-conducting operational mode of said transistor means;

said control circuit means comprising a current to voltage converter means having an input and an output, said input being connected to said photodiode detector means and said output constituting the output of said electronic circuit;

said current to voltage converter including an operational amplifier, said control circuit means including a filter block; and said filter block constituting a feedback branch of said operational amplifier and said filter block defining a frequency range containing said specific modulation frequency or said specific modulation frequency range.

45. An electronic price display communicating with a master station through an infrared wireless link for receiving information from said master station as modulated infrared light, said display comprising:

an electronic circuit for receiving and discriminating such modulated light of a specific modulation frequency or within a specific modulation frequency range; and a display circuit communicating with said electronic circuit for displaying information thereon received and discriminated by said electronic circuit;

wherein said electronic circuit comprises:

a photodiode detector means responsive to light incident to said photodiode detector means for generating an electric current signal in response to said light;

a shunting transistor means connected in parallel with said photodiode detector means and having a gate; and an active filter circuit means having an input and an output, said input being connected to said photodiode detector means for receiving said electric current signal therefrom, said output being connected to said gate of said shunting transistor means, and said input and said output being interconnected through a filter block defining a frequency range, said frequency range containing said specific modulation frequency or containing said specific modulation frequency range, and said active filter circuit means including said filter block constituting a closed loop feed forward circuit or a closed loop feed back circuit, respectively.

46. An electronic price display communicating with a master station through an infrared wireless link for receiving information from said master station as modulated infrared light, said display comprising:

an electronic circuit for receiving and discriminating such modulated light of a specific modulation frequency or within a specific modulation frequency range; and a display circuit communicating with said electronic circuit for displaying information thereon received and discriminated by said electronic circuit;

wherein said electronic circuit comprises:

a photodiode detector means, responsive to light incident to said photodiode detector means, for generating an electric current signal in response to said light;

a shunting transistor means connected in parallel with said photodiode detector means and having a gate; and an active filter circuit means having an input and an output, said input being connected to said photodiode detector means for receiving said electric current signal therefrom, said output being connected to said gate of said shunting transistor means, and said input and said output being interconnected through a filter block defining a frequency range, said frequency range containing said specific modulation frequency or containing said specific modulation frequency range, and said active filter circuit means including said filter block constituting a closed loop feed forward circuit or a closed loop feed back circuit, respectively;

said transistor means comprising a gate for controlling said transistor means into first or said second operational modes, said first operational mode being constituted by a conducting operational mode of said transistor means and said second operational mode being constituted by a nonconducting operational mode of said transistor means;

said active filter circuit means comprising a current to voltage converter means having an input and an output, said input being connected to said photodiode detector means and said output constituting the output of said electronic circuit; and said current to voltage converter including an operational amplifier.

47. An electronic price display communicating with a master station through an infrared wireless link for receiving information from said master station as modulated infrared light, said display comprising:

an electronic circuit for receiving and discriminating such modulated light of a specific modulation frequency or within a specific modulation frequency range; and a display circuit communicating with said electronic circuit for displaying information thereon received and discriminated by said electronic circuit, said electronic circuit comprising:

a photodiode detector means responsive to light incident to said photodiode detector means and biased in its forward direction for generating an electric current signal in response to said light;

a shunting transistor means connected in parallel with said photodiode detector means and having a gate; and an active filter circuit means having an input and an output, said input being connected to said photodiode detector means for receiving said electric current signal therefrom, said output being connected to said gate of said shunting transistor means, and said input and said output being interconnected through a filter block defining a frequency range containing said specific modulation frequency or containing said specific modulation frequency range, and said active filter circuit means including said filter block constituting a closed loop circuit, and said active filter circuit means modulating said shunting transistor means so as to cause said shunting transistor means (a) to shunt said photodiode means, provided said electric current signal generated by said photodiode detector means is not a signal of said specific modulation frequency or within said specific modulation frequency range, or (b) not to shunt said photodiode detector means, provided said electric current signal general by said photodiode detector means is a signal of said specific modulation frequency or within said specific modulation frequency range.

48. An electronic price display communicating with a master station through an infrared wireless link for receiving information from said master station as modulated infrared light, said display comprising:

an electronic circuit for receiving and discriminating such modulated light of a specific modulation frequency or within a specific modulation frequency range; and a display circuit communicating with said electronic circuit for displaying information thereon received and discriminated by said electronic circuit;

wherein said electronic circuit comprises:

a photodiode detector means responsive to light incident to said photodiode detector means and biased in its forward direction for generating an electric current signal in response to said light;

a shunting transistor means connected in parallel with said photodiode detector means and having a gate; and an active filter circuit means having an input and an output, said input being connected to said photodiode detector means for receiving said electric current signal therefrom, said output being connected to said gate of said shunting transistor means, and said input and said output being interconnected through a filter block defining a frequency range containing said specific modulation frequency or containing said specific modulation frequency range, and said active filter circuit means including said filter block constituting a closed loop circuit, and said active filter circuit means modulating said shunting transistor means so as to cause said shunting transistor means (a) to shunt said photodiode means, provided said electric current signal generated by said photodiode detector means is not a signal of said specific modulation frequency or within said specific modulation frequency range, or (b) not to shunt said photodiode detector means, provided said electric current signal general by said photodiode detector means is a signal of said specific modulation frequency or within said specific modulation frequency range;

said shunting transistor means comprising a gate for controlling said transistor means into first or said second operational modes, said first operational mode being constituted by a conducting operational mode of said transistor means and said second operational mode being constituted by a nonconducting operational mode of said transistor means;

said active filter circuit means comprising a current to voltage converter means having an input and an output, said input being connected to said photodiode detector means and said output constituting the output of said electronic circuit; and said current to voltage converter including an operational amplifier.

* * * * *